(12) United States Patent
Cheng et al.

(10) Patent No.: US 8,234,497 B2
(45) Date of Patent: Jul. 31, 2012

(54) METHOD AND APPARATUS FOR PROVIDING SECURE LINKING TO A USER IDENTITY IN A DIGITAL RIGHTS MANAGEMENT SYSTEM

(75) Inventors: Yi Cheng, Sundbyberg (SE); Frank Hartung, Herzogenrath (DE); Nilo Mitra, New York, NY (US); Ignacio Mas Ivars, Tullinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 295 days.

(21) Appl. No.: 12/738,390

(22) PCT Filed: Oct. 22, 2008

(86) PCT No.: PCT/IB2008/002822
§ 371 (c)(1),
(2), (4) Date: Apr. 16, 2010

(87) PCT Pub. No.: WO2009/053818
PCT Pub. Date: Apr. 30, 2009

(65) Prior Publication Data
US 2010/0262831 A1    Oct. 14, 2010

Related U.S. Application Data

(60) Provisional application No. 60/981,928, filed on Oct. 23, 2007.

(51) Int. Cl.
*H04L 29/06* (2006.01)
(52) U.S. Cl. .................................................... 713/176
(58) Field of Classification Search .................... 713/176
See application file for complete search history.

(56) References Cited

U.S. PATENT DOCUMENTS

2003/0172090 A1 * 9/2003 Asunmaa et al. ............. 707/200
(Continued)

OTHER PUBLICATIONS

3rd Generation Partnership Project. 3GPP TS 33.220, V6.3.0 (Dec. 2004). 3rd Generation Partnership Project; Technical Specification Group Services and System Aspects; Generic Authentication Architecture (GAA); Generic bootstrapping architecture (Release 6). Dec. 2004.

*Primary Examiner* — Michael S McNally
(74) *Attorney, Agent, or Firm* — Coats and Bennett PLLC

(57) ABSTRACT

Disclosed is a DRM device and method for providing secure linking to a user identity. A first request is sent to a subscriber identity module. A message is received from the subscriber identity module via a secure authenticated channel. The message comprises at least a master key identifier, a random number, and a derived key. In response to the message, a second request is sent to a DRM server. The second request comprises at least a master key identifier, the device identifier, and a random number. Also disclosed is a DRM server and method for providing secure linking to a user identity. A first request is received from a DRM device. The first request comprises at least master key identifier, a device identifier, and a random number. The DRM device is authenticated. A second request for an application specific key is sent to a trusted key management server. The second request comprises at least a master key identifier. At least a key is received from the trusted key management server. A derived key is determined from the key received from the trusted key management server based at least on the device identifier and the random number. A challenge/response scheme is used to determine whether the derived key of the DRM server matches a derived key of the DRM device.

20 Claims, 6 Drawing Sheets

U.S. PATENT DOCUMENTS

2005/0011947 A1* 1/2005 Reddy et al. ................ 235/380
2005/0216763 A1* 9/2005 Lee et al. .................... 713/200
2006/0281442 A1* 12/2006 Lee et al. ................. 455/412.2
2007/0136205 A1* 6/2007 Przybilla ...................... 705/54

* cited by examiner

METHOD AND APPARATUS FOR PROVIDING SECURE LINKING TO A USER IDENTITY IN A DIGITAL RIGHTS MANAGEMENT SYSTEM

CROSS-REFERENCE TO RELATED APPLICATIONS

This application claims the benefit of U.S. Provisional Application No. 60/981,928, filed Oct. 23, 2007, the disclosure of which is incorporated herein by reference.

TECHNICAL FIELD

The present invention relates to digital rights management (DRM). More particularly, and not by way of limitation, the present invention is directed to an apparatus and method for providing secure linking to a user identity.

BACKGROUND

A problem with known methods for consuming contents relates to the fact that most content consuming devices today are not provided with a user identity module, e.g., a subscriber identity module (SIM). This is often the case with common consumer devices, e.g., PC, TV, movable media player. A simple solution would be, at content purchase time when user identity is provided for charging purposes, to also indicate the identity of the consuming device(s). But this is not always feasible as the user may not know in advance on which device(s) the purchased content will be played. Also, indicating device identities may be disadvantageous in terms of usability.

Another way to link device to user is for the service provider to maintain a database recording the relationship between users and devices. But in order to keep such a database up-to-date, the user has to inform the service provider each time a new device is bought or an old device discarded, which puts a heavy burden on the user. Furthermore, the static database is not able to support use cases where the user temporarily makes use of a foreign device (e.g. TV in a hotel room) to play content.

Yet another solution is to issue a token to the user after he or she is successfully authenticated. Such a token contains the authenticated user identity and must be presented to the DRM server for license acquisition. A drawback of this token-based solution is that, since anyone who gets hold of the token (or a copy of it) can acquire licenses under the user's name, the token must be distributed in a secure way. Of course the token itself must also be authenticity/integrity protected so that no one can fake a token or change the user identity contained in it.

Thus, there is a need for method and arrangement that overcomes many of the disadvantages of known methods to provide and charge for contents for consumption at a user device.

SUMMARY

The present invention discloses a DRM device and method for providing secure linking to a user identity. In one embodiment, a first request is sent from a DRM device to a subscriber identity module. The first request comprises at least a device identifier. The subscriber identity module performs a security bootstrapping procedure with a trusted key management server and they agree on a shared master key. The subscriber identity module or the device hosting the subscriber identity module derives a key from the master key based at least on the device identifier and a random number. A message is returned to the DRM device via a secure authenticated channel. The message comprises at least an identifier for the master key, the random number and the derived key. In response to the message, a second request is sent to a DRM server. The second request comprises at least the master key identifier, the device identifier and the random number.

Also disclosed is a DRM server and method for providing secure linking to a user identity. In one embodiment, a first request is received from a DRM device. The first request comprises at least a master key identifier, a device identifier and a random number. The DRM device is authenticated in a DRM-specific way. A second request is sent to a trusted key management server. The second request comprises at least the master key identifier. A derived key is determined from the master key based at least on the device identifier and the random number. A challenge/response scheme is used to determine whether the derived key of the DRM server matches a derived key of the DRM device.

BRIEF DESCRIPTION OF THE DRAWINGS

In the following section, the invention will be described with reference to exemplary embodiments illustrated in the figures, in which.

DETAILED DESCRIPTION

In the following a DRM device shall mean a device that is capable of receiving and consuming contents that are protected by some method for digital rights management and complies to requirements associated with said method. Further, a DRM system shall mean a system that manages protected contents for consumption at a DRM device.

A method and arrangement is disclosed for linking DRM device to user identity in a dynamic and cryptographically secure way. A user and device specific key is produced as the result of both successful user authentication, based on subscriber identity module (*SIM), where *SIM represents different types of subscriber identity modules, e.g., SIM, USIM (Universal Subscriber Identity Module), ISIM (IP Multimedia Services Identity Module), etc., and successful device authentication. A device that knows the specific key may prove to the service provider that the device is a DRM device and is currently linked to a particular user identity.

Figure 1:
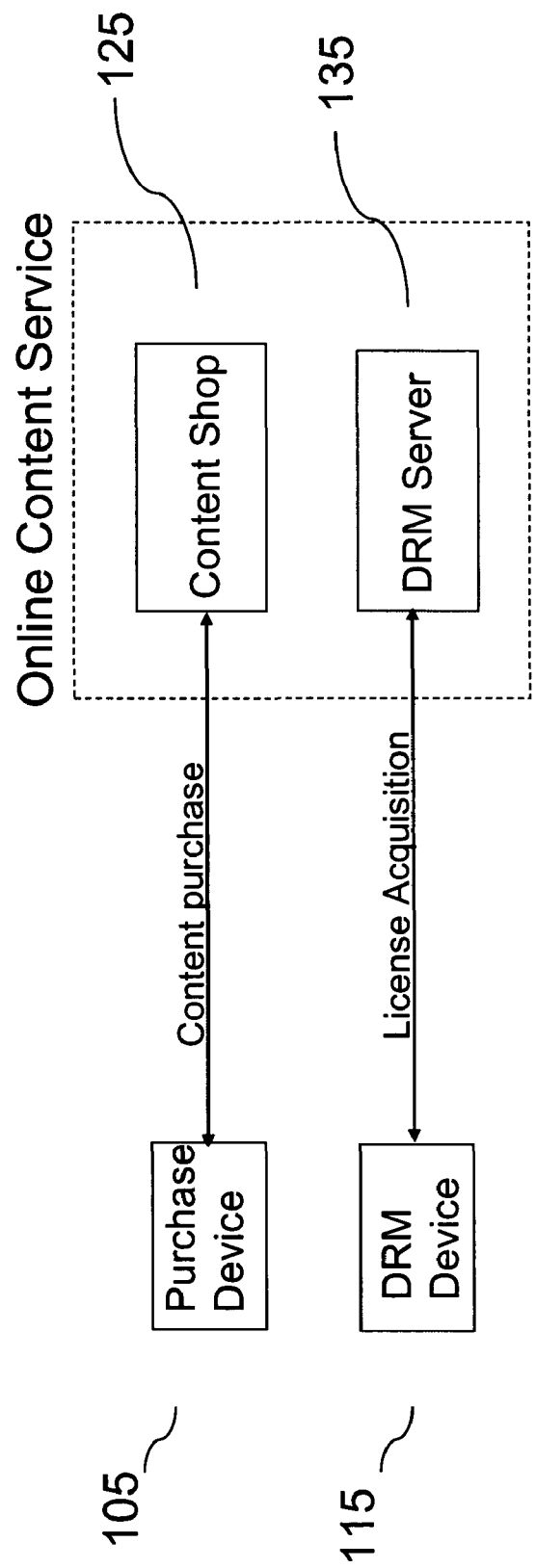
FIG. 1 illustrates a content purchase step and license acquisition step in accordance with one embodiment.

FIG. 1 illustrates the content purchase step and the license acquisition step relevant for this disclosure. In the content purchase step, the user is authenticated before being allowed to make any order. In the license acquisition step, by using a DRM-specific mechanism (e.g. device certificate), the DRM server 135 authenticates the DRM-enabled consuming device (hereafter known as DRM device 115) and checks the current status of the device 115. If the device is known to have been compromised, the DRM server 135 rejects the license acquisition request.

An online content service, e.g., comprising content shop 125 and DRM server 135 usually takes several steps, including content browsing of content offered by content shop 125, content purchase via content purchase device 105, and delivery of purchased (usually protected using method for digital rights management DRM) content, license acquisition, and finally content consumption on one or more devices. The device that is used for purchasing the content may or may not be the device that actually consumes the content. The consuming device needs a license to play the content. It may acquire the license by itself (e.g. a device bound license) or it may get a license (e.g. a domain bound license) from some other device.

The DRM device 115 that is authenticated at the license acquisition step must be securely linked to the user that is authenticated at the content purchase step. Otherwise an attacker's device, which can be a legitimate DRM device, may obtain the license for free. The normal approach taken by current service providers is to require username/password based authentication at both steps (or in case the purchasing device and the DRM device requesting license are the same, the two steps occur in conjunction and share the same security context established based on username/password).

In an operator-managed service infrastructure (e.g. IMS) users have security credential that is better than a username/password combination, that is, a tamper-proof Subscriber Identity Module (*SIM). The online content services should naturally leverage the enhanced security by using *SIM-based user authentication (or more precisely subscriber authentication). As the content cost can be charged to the same *SIM subscription as other services the user receives, for instance voice calls, this also makes billing simpler from both operator's and user's perspective.

Figure 2:
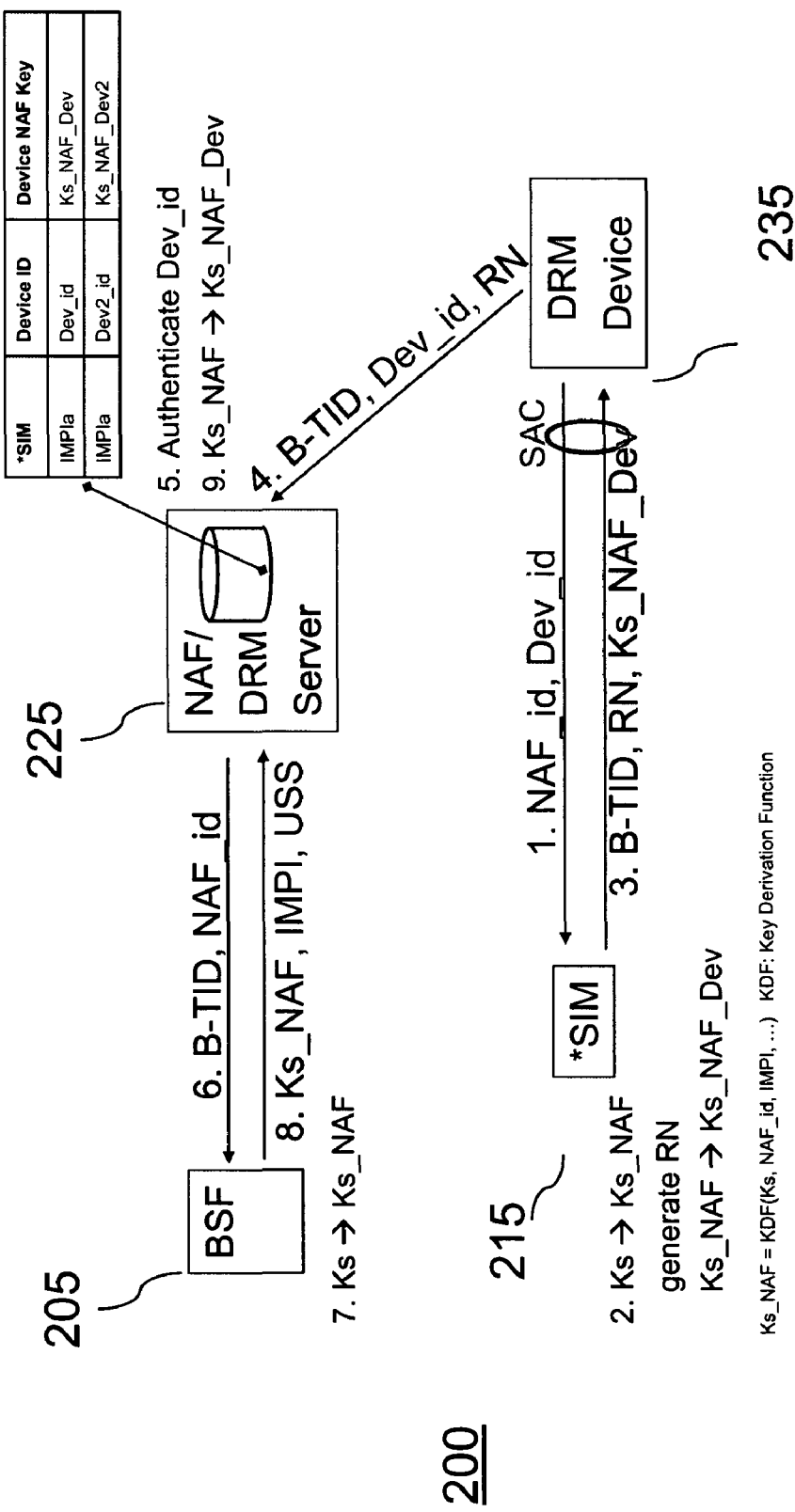
FIG. 2 illustrates a DRM system in accordance with one embodiment.

FIG. 2 illustrates a DRM system 200 in accordance with one embodiment. A DRM device 235 may be connected to the device that hosts the user identity module hereafter referred to as *SIM 215 by some local means. Multiple devices may be connected to the *SIM-hosting device, e.g., device 305 of FIG. 3, at the same time where the *SIM 215 serves those devices simultaneously, e.g., in a home IMS gateway scenario.

There is a secure authenticated channel (SAC) between DRM device 235 and *SIM 215. This channel may be established by using various mechanisms e.g. Bluetooth SIM access or ETSI TS 102 484. The details of SAC establishment are well known in the art.

Generally, embodiments of the present invention rely on a secure *SIM-based bootstrapping procedure that after successful user authentication results in a key shared between the *SIM and a trusted key management server. It is assumed that the DRM Server can retrieve that key (or a key derived from it) from the key management server.

One embodiment of the invention will now be described which, in order to make the description clear and easy to follow, is based on the 3GPP Generic Bootstrapping Architecture (GBA) as the bootstrapping protocol. However, as is clear for a person skilled in the art, any other protocol that uses *SIM to authenticate user and after successful authentication establish a shared key between the *SIM and the key management server may be used with the invention.

In the context of GBA, bootstrapping function 205 (BSF) is the trusted key management server and the key shared between *SIM 215 and BSF 205 is master key Ks, which is identified by the bootstrapping transaction id (B_TID). DRM Server 225, acting as Network Application Function (NAF) in GBA terminology, retrieves a key derived from Ks, i.e. application specific key (Ks_NAF), from BSF 205.

The steps shown in FIG. 2 occur at the time of license acquisition. As a pre-step, the user has been authenticated by running GBA. BSF 205 and the user's *SIM 215, thereafter, share master key, Ks, and B-TID.

The procedure is as follows:

1. DRM Device 235 needs to acquire a license from DRM Server 225. Before acquiring the license, DRM Device 235 sends a request to *SIM 215, containing the identifier of the DRM Server (NAF_id) and the Device ID (Dev_id). The Device ID is an identifier of the device that is assigned by the DRM system.

2. Based on the NAF_id, *SIM 215 derives application specific key (Ks_NAF) from master key, Ks. Then based on the Dev_id and a random number (RN), *SIM 215 further derives derived key (Ks_NAF_Dev) from application specific key (Ks_NAF). The random number RN may, in one embodiment, be generated by *SIM 215 and in another embodiment provided by the *SIM-hosting device 315 fresh at each derivation of Ks_NAF_Dev.

Note that GBA has two variants: Generic Bootstrapping Architecture Universal Identification Circuit Card (GBA_UICC or GBA_U) and GBA Mobile Equipment (GBA_ME). In the GBA_U variant, the master key is generated by *SIM 215. *SIM 215 later derives an application specific key upon request. *SIM 215 actually derives an internal application specific key (Ks_int_NAF) and an external application specific key (Ks_ext_NAF) from master key, Ks. In this embodiment, Ks_NAF refers to Ks_int_NAF and is used by *SIM 215 to derive Ks_NAF_Dev. In another embodiment, Ks_NAF may refer to Ks_ext_NAF and be used by device 235 to derive Ks_NAF_Dev.

In the GBA_ME variant, *SIM 215 generates the master key, Ks. Mobile Equipment (ME or host), e.g., device 305, derives further keys (both Ks_NAF and Ks_NAF_Dev) from the master key.

3. The *SIM returns B-TID, RN and Ks_NAF_Dev to the DRM Device, within the Secure Authenticated Channel (SAC).

4. The DRM Device sends a request to the DRM Server, which, among other things, contains the B-TID, Dev_id and RN.

The license acquisition protocol is determined by the DRM system used. Typically, the protocol entails a series of message exchanges. B-TID, Dev_id and RN are sent in the communication in which DRM Server 225 first authenticates DRM Device 235. The communication includes information that is required for device authentication, e.g. a device certificate and signature.

5. DRM Server 225 authenticates DRM device 235 by using a specific mechanism e.g. verifying device certificate and signature. If the authentication succeeds, DRM server 225 continues with step 6. Otherwise DRM server 225 rejects the request from DRM Device 235.

6. DRM Server 225 (acting as a Network Application Function (NAF)) contacts BSF 205 for retrieving Ks_NAF, presenting B-TID and NAF_id as input.

7. BSF 205 retrieves Ks based on B-TID and derives Ks_NAF from Ks.

8. BSF 205 returns Ks_NAF, IMPI (IMS Private Identity) and USS (User Security Setting) back to DRM Server 225.

9. Based on Dev_id and RN, DRM Server 225 derives Ks_NAF_Dev from Ks_NAF.

10. DRM Server 225 checks that DRM Device 235 knows the correct Ks_NAF_Dev. In one embodiment, DRM Server 225 uses a challenge/response scheme before granting the license.

Within an appropriate time period, DRM Device 235 may reuse Ks_NAF_Dev to acquire new licenses without going through the whole procedure again. The time period may not exceed the lifetime of Ks. In one embodiment, the time period is decided by DRM Server 225.

In one embodiment, key derivation function KDF used to derive Ks_NAF from Ks is based on HMAC-SHA-256, as specified by GBA. For the derivation of Ks_NAF_Dev from Ks_NAF, the same KDF can be used. But other start-of-the-art secure keyed hash algorithms may be used. Input parameters to the key derivation function must include Ks_NAF (as the key to the keyed hash function), Dev_id and RN. Other parameters may be added as appropriate.

Figure 3:
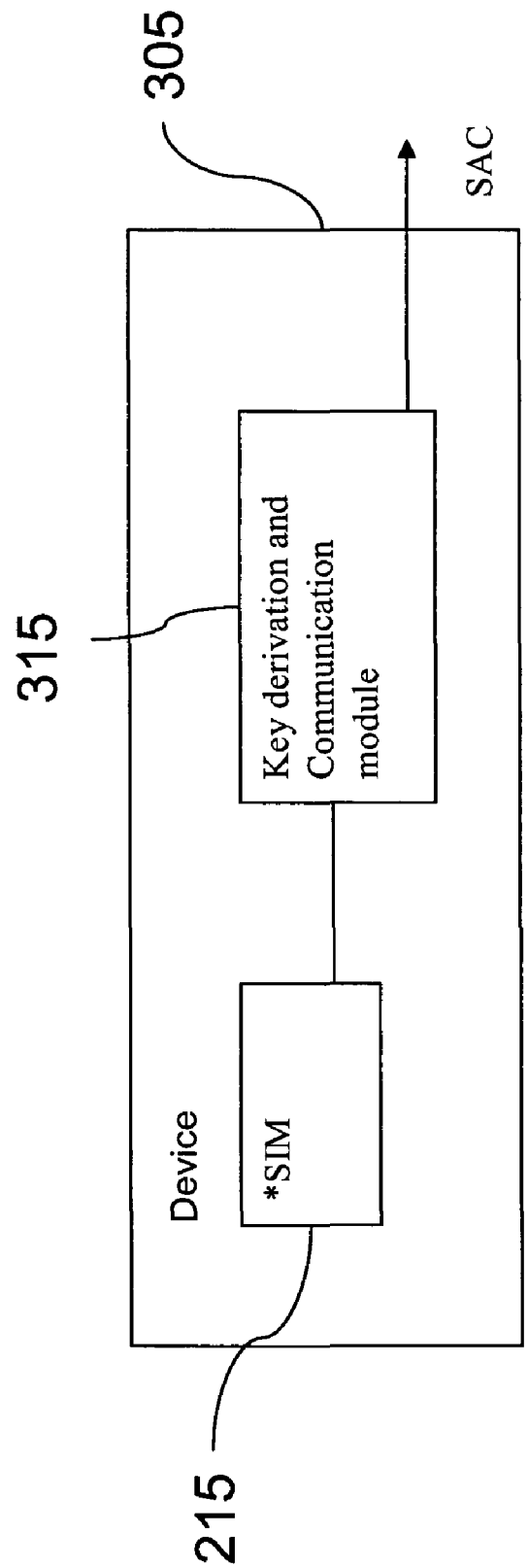
FIG. 3 illustrates a host device in accordance with one embodiment.

FIG. 3 illustrates a device including a *SIM module 215 and a key derivation and communication module 315 communicating over SAC with external entities. In FIG. 3, DRM Device 225 communicates with *SIM 215 directly. In some scenarios, where the device 305 hosting *SIM 215 is trusted (e.g. an Internet Protocol Multimedia Subsystem (IMS) gateway), DRM Device 225 communicates with *SIM-hosting device 305 instead (and the *SIM-hosting device 305 communicates with *SIM 215). In this embodiment, *SIM-hosting device 305 derives Ks_NAF_dev from Ks_NAF, and a SAC is established between *SIM-hosting device 305 and the DRM Device 235. The advantage of this approach is that "normal" *SIM can be used, i.e. there is no need to extend the *SIM with extra capabilities to support the proposed solution.

In addition to license acquisition, Ks_NAF_Dev may be used to facilitate other transactions that require proof of device-user linkage and/or the status of the device. As Ks_NAF_Dev, e.g., the derived key, is device-specific, i.e. different devices that make use of the same *SIM get different keys, this derived key may be used to authenticate and/or encrypt any DRM system protocol messages exchanged between the device 235, 305 and the DRM server 225.

Note this proposed solution can also be used when the DRM Device 235 actually hosts a *SIM, either the same *SIM that's used for user authentication (in which case the SAC becomes a device internal interface) or a different *SIM (which for example belongs to another user).

Figure 4:
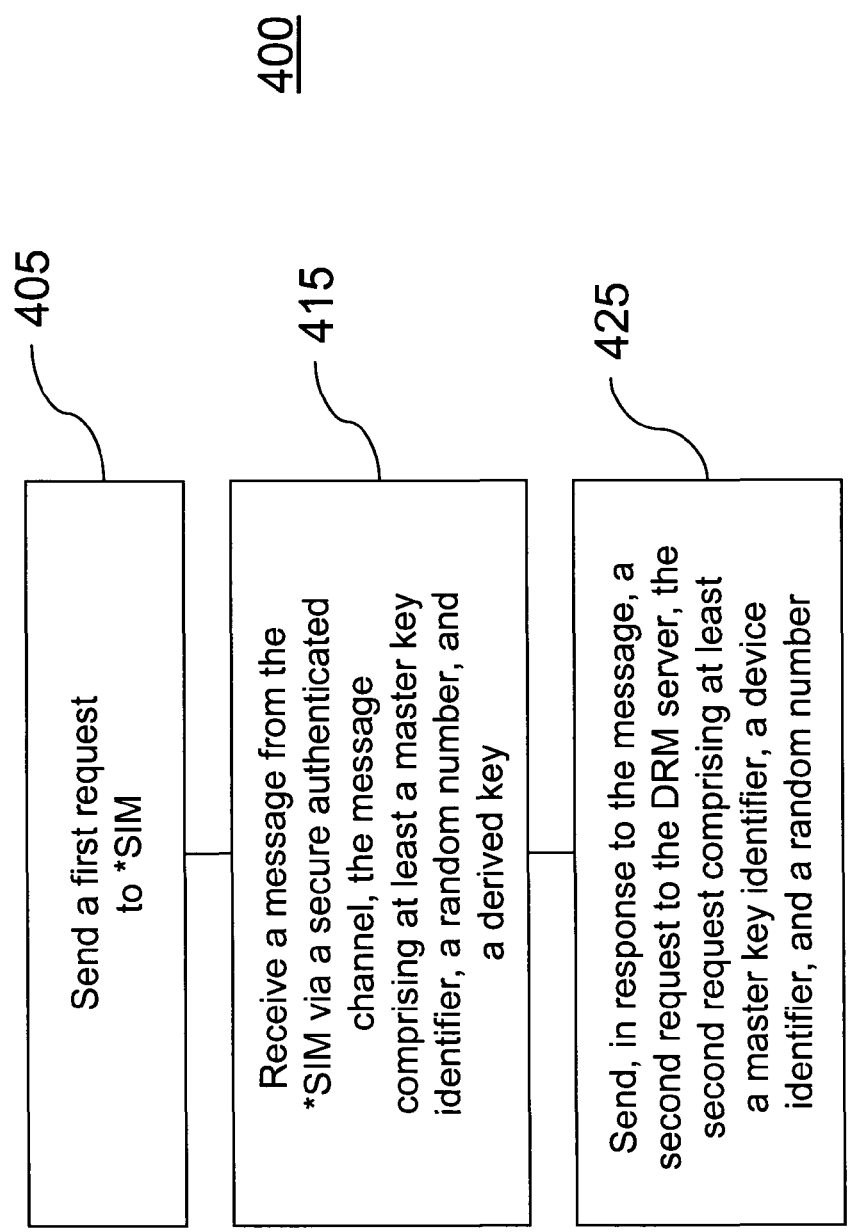
FIG. 4 illustrates a diagram of a method in accordance with one embodiment.

FIG. 4 illustrates a method for providing secure linking to a user identity at a DRM Device, e.g., DRM Device 235. DRM Device 235 needs to acquire a license from DRM Server 225. At step 405 a first request is sent from DRM Device 235 to a user identity module, i.e., *SIM 215. The first request contains a network application function identifier of DRM Server 225 and a device identifier of DRM Device 235. The Device ID is an identifier of the device that is assigned by the DRM system.

At step 415, a message from user identity module 215 is received via a secure authenticated channel. This message contains at least a master key identifier, a random number and a derived key. In one embodiment, the message contains a GBA bootstrapping transaction identifier which also identifies the master key Ks, a random number, and a derived key. In this embodiment, DRM Device 235 receives B-TID, RN and Ks_NAF_Dev from *SIM 215, within the Secure Authenticated Channel (SAC).

At step 425, in response to the message, a second request is sent to DRM server 225. The second request contains at least a master key identifier, a device identifier and a random number. In one embodiment, the second request contains the GBA bootstrapping transaction identifier, the device identifier, and the random number.

DRM Device 235 sends a request to DRM Server 225, which, among other things, contains the B-TID, Dev_id and RN.

The license acquisition protocol is determined by the DRM system used. Typically, the protocol entails a series of message exchanges. B-TID, Dev_id and RN are sent in the communication in which DRM Server 225 first authenticates DRM Device 235. The communication includes information that is required for device authentication, e.g. a device certificate and signature.

Figure 5:
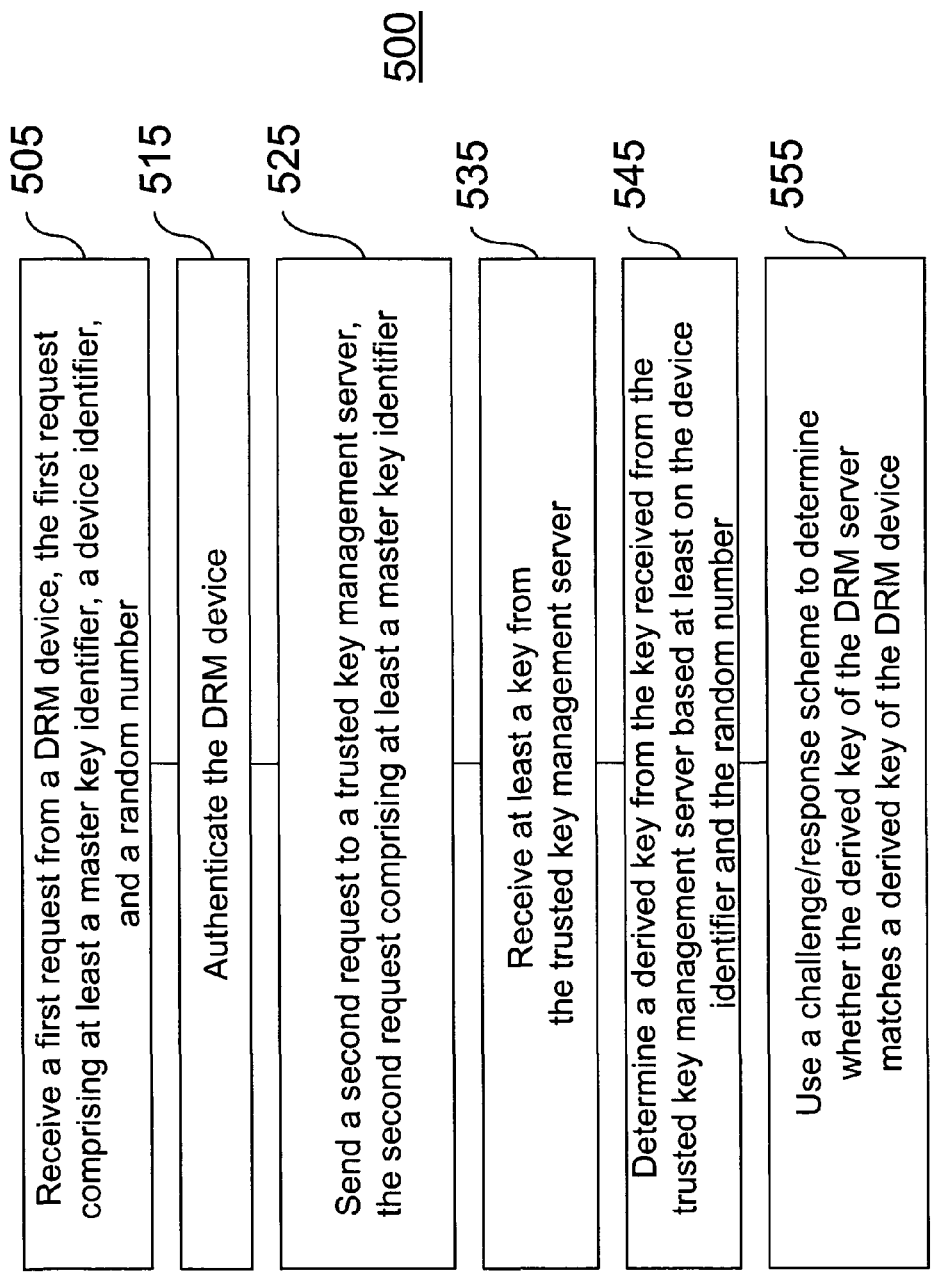
FIG. 5 illustrates a diagram of a method in accordance with one embodiment.

FIG. 5 illustrates a method for providing secure linking to a user identity at a DRM Server, e.g., NAF/DRM Server 225. At step 505, a first request is received from DRM device 235. The first request contains at least a master key identifier, a device identifier and a random number. In one embodiment, the first request contains a GBA bootstrapping transaction identifier, a device identifier, and a random number.

DRM Server 225 receives a request for a license from DRM device 235, which, in one embodiment, among other things, contains the B-TID, Dev_id and RN. The license acquisition protocol is determined by the DRM system used. Typically, the protocol entails a series of message exchanges. In this embodiment, B-TID, Dev_id and RN are sent in the communication in which DRM Server 225 first authenticates DRM Device 235. The communication includes information that is required for device authentication, e.g. a device certificate and signature.

At step 515, DRM device 235 is authenticated by DRM Server 225. DRM Server 225 authenticates DRM device 235 by using a DRM-specific mechanism e.g. verifying device certificate and signature. If the authentication succeeds, DRM server 225 continues with step 525. Otherwise DRM server 225 rejects the request from DRM Device 235.

At step 525, a second request is sent to a trusted key management server, e.g., bootstrapping server function (BSF) 205. The second request contains at least a master key identifier. In an embodiment where the trusted key management server comprises a BSF, the second request contains the bootstrapping transaction identifier and a network application function identifier. At step 525, in the embodiment where the trusted key management server is a BSF, DRM Server 225 (acting as a Network Application Function (NAF)) contacts BSF 205 for retrieving Ks_NAF, presenting B-TID and NAF_id as input.

At step 535, at least a key is received from the trusted key management server, e.g., BSF 205. In one embodiment, the application specific key, an internet protocol multimedia subsystem private identity (IMPI), and a user security setting (USS) is received from BSF 205.

At step 545, a derived key is determined from the key received from the trusted key management server, based on at least the device identifier and the random number. In one embodiment, the derived key is determined from the application specific key based on the device identifier and the random number RN.

At step 555, a challenge/response scheme is used to determine whether the derived key of the DRM server matches a derived key of the DRM device. DRM Server 225 checks that DRM Device 235 knows the correct Ks_NAF_Dev. In one embodiment, DRM Server 225 uses a challenge/response scheme before granting the license.

Figure 6:
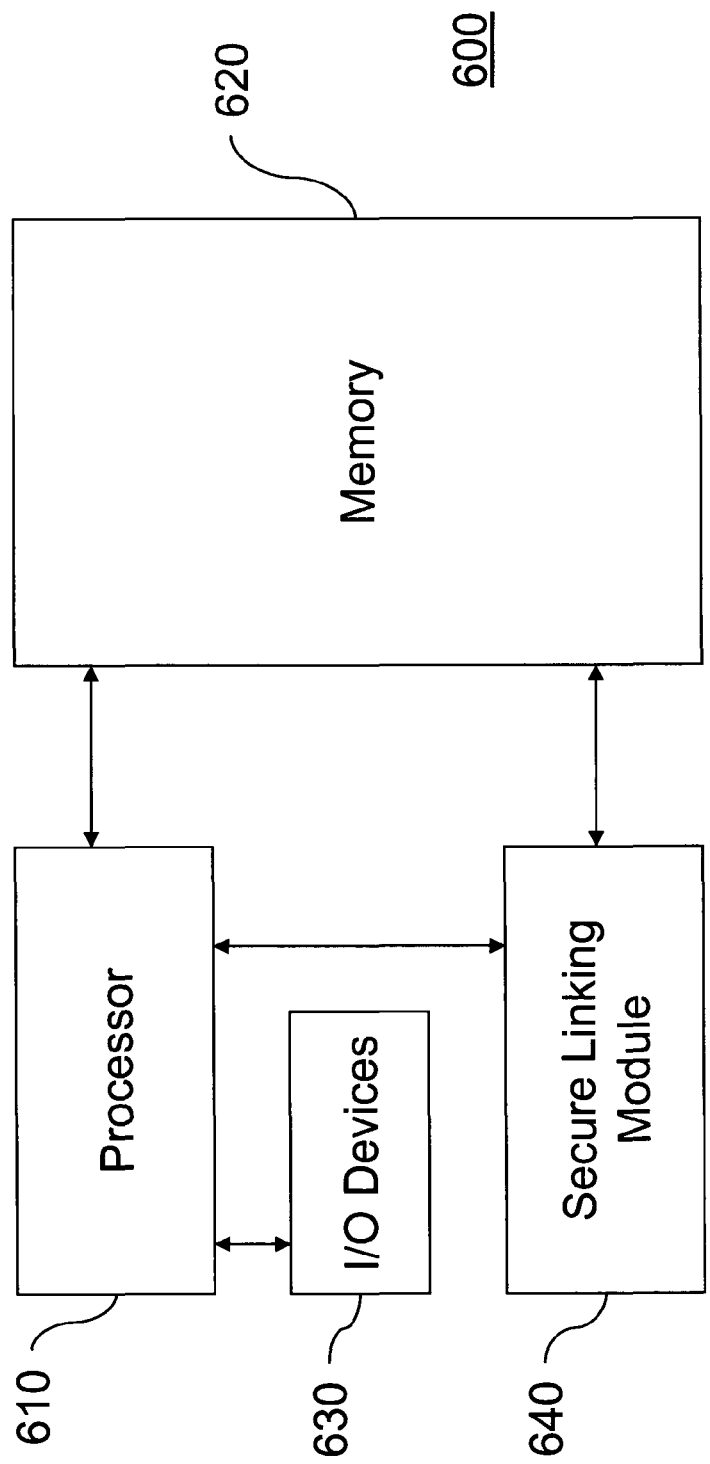
FIG. 6 illustrates a block diagram of a node in a DRM system in accordance with one embodiment.

FIG. 6 illustrates a block diagram 600 of a node 205, 215, 225, 235, 305 within a DRM System of the present invention. Specifically, the system can be employed to provide a secure linking of a DRM Device, e.g., DRM Device 235 to a user identity. In one embodiment, the node 205, 215, 225, 235, 305 is implemented using a general purpose computer or any other hardware equivalents.

Thus, node 205, 215, 225, 235, 305 comprises a processor (CPU) 610, a memory 620, e.g., random access memory (RAM) and/or read only memory (ROM), secure linking module 640, and various input/output devices 630 (e.g., storage devices, including but not limited to, a tape drive, a floppy drive, a hard disk drive or a compact disk drive, a receiver, a transmitter, a speaker, A/D and D/A converters).

It should be understood that secure linking module 640 can be implemented as one or more physical devices that are coupled to the CPU 610 through a communication channel. Alternatively, secure linking module 640 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 620 of the computer. As such, the packet detection module 640 (including associated data structures) of the present invention can be stored on a computer readable medium, e.g., RAM memory, magnetic or optical drive or diskette and the like.

The following advantages are evident in the present application:

Provides dynamic binding between user and device in a secure way

Provides simple management of the device key Ks_NAF_Dev requiring no extra confidentiality protection.

Facilitates single sign on.

Provides, through the key, Ks_NAF_Dev, for protection of DRM protocol messages.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

The invention claimed is:

1. An apparatus for providing secure linking to a user identity, comprising:
   a digital rights management (DRM) device configured to:
      send a first request to a user identity module, the first request comprising at least a device identifier of the DRM device;
      receive a message from said user identity module via a secure authenticated channel, the message comprising at least a master key identifier, a random number and a derived key; and
      send, in response to said message, a second request to a DRM server, the second request comprising at least the master key identifier, the device identifier and the random number.

2. The apparatus of claim 1, wherein the second request comprises information that is required for DRM-specific device authentication.

3. The apparatus of claim 2, wherein the information comprises a device certificate and signature.

4. The apparatus of claim 1, wherein the apparatus is configured to reuse the derived key in order to acquire a new license within a specified time period.

5. A method for providing secure linking to a user identity, comprising:
   sending a first request to a user identity module, the first request comprising at least a device identifier of the DRM device;
   receiving a message from said user identity module via a secure authenticated channel, the message comprising at least a master key identifier, a random number and a derived key;
   sending, in response to said message, a second request to a DRM server, the second request comprising at least the master key identifier, the device identifier and the random number.

6. The method of claim 5, wherein the second request comprises information that is required for DRM-specific device authentication.

7. The method of claim 6, wherein the information comprises a device certificate and signature.

8. The method of claim 5, further comprising reusing the derived key in order to acquire a new license within a specified time period.

9. An apparatus for providing secure linking to a user identity, said apparatus comprising:
   a digital rights management (DRM) server configured to:
      receive a first request from a DRM device, the first request comprising at least a master key identifier, a device identifier and a random number;
      authenticate the DRM device in a DRM-specific way;
      send a second request to a trusted key management server, the second request comprising at least the master key identifier;
      receive at least a key from the trusted key management server;
      determine a derived key from the key based at least on the device identifier and the random number; and
      use a challenge/response scheme to determine whether the derived key of the DRM server matches a derived key of the DRM device.

10. The apparatus of claim 9, wherein the first request comprises information that is required for DRM-specific device authentication.

11. The apparatus of claim 10, wherein the information comprises a device certificate and signature.

12. The apparatus of claim 9, wherein authenticating the DRM device comprises verifying the device certificate and signature.

13. The apparatus of claim 9, further comprising reusing the derived key in order to issue a new license within a specified time period.

14. The apparatus of claim 13, wherein the specified time period is determined by the DRM server.

15. A method for providing secure linking to a user identity, comprising:
   receiving a first request from a DRM device, the first request comprising at least a master key identifier, a device identifier and a random number;
   authenticating the DRM device in a DRM-specific way;
   sending a second request to a trusted key management server, the second request comprising at least the master key identifier;
   receiving at least a key from the trusted key management server;
   determining a derived key from the key based at least on the device identifier and the random number; and
   using a challenge/response scheme to determine whether the derived key of the DRM server matches a derived key of the DRM device.

16. The method of claim 15, wherein the first request comprises information that is required for DRM-specific device authentication.

17. The method of claim 16, wherein the information comprises a device certificate and signature.

18. The method of claim 15, wherein authenticating the DRM device comprises verifying the device certificate and signature.

19. The method of claim 15, further comprising reusing the derived key in order to issue a new license within a specified time period.

20. The method of claim 19, wherein the specified time period is determined by the DRM server.

* * * * *

UNITED STATES PATENT AND TRADEMARK OFFICE
CERTIFICATE OF CORRECTION

| | | |
|---|---|---|
| PATENT NO. | : 8,234,497 B2 | |
| APPLICATION NO. | : 12/738390 | |
| DATED | : July 31, 2012 | |
| INVENTOR(S) | : Cheng et al. | |

It is certified that error appears in the above-identified patent and that said Letters Patent is hereby corrected as shown below:

On the Face Page, in Field (75), under "Inventors", in Column 1, Lines 3-4, delete "Ignacio Mas Ivars," and insert -- Ignacio Más Ivars, --, therefor.

Signed and Sealed this
Eighteenth Day of December, 2012

David J. Kappos
*Director of the United States Patent and Trademark Office*